United States Patent
Eberle et al.

(10) Patent No.: US 7,327,674 B2
(45) Date of Patent: Feb. 5, 2008

(54) PREFETCHING TECHNIQUES FOR NETWORK INTERFACES

(75) Inventors: Hans Eberle, Mountain View, CA (US); Nils Gura, Santa Clara, CA (US); Marc Herbert, Villeurbanne (FR)

(73) Assignee: Sun Microsystems, Inc., Santa Clara, CA (US)

( * ) Notice: Subject to any disclaimer, the term of this patent is extended or adjusted under 35 U.S.C. 154(b) by 938 days.

(21) Appl. No.: 10/166,874

(22) Filed: Jun. 11, 2002

(65) Prior Publication Data

US 2003/0227933 A1   Dec. 11, 2003

(51) Int. Cl.
*H04L 12/26*   (2006.01)
*H04L 12/56*   (2006.01)
*H04L 12/66*   (2006.01)

(52) U.S. Cl. .................. 370/230; 370/412; 370/419; 370/463

(58) Field of Classification Search ................. 370/229, 370/230, 235, 389, 412, 419, 463
See application file for complete search history.

(56) References Cited

U.S. PATENT DOCUMENTS

| | | | | |
|---|---|---|---|---|
| 5,751,951 | A * | 5/1998 | Osborne et al. | 709/250 |
| 6,026,090 | A * | 2/2000 | Benson et al. | 370/395.7 |
| 6,430,527 | B1 * | 8/2002 | Waters et al. | 703/3 |
| 6,747,949 | B1 * | 6/2004 | Futral | 370/231 |
| 7,006,530 | B2 * | 2/2006 | Spinar et al. | 370/468 |
| 7,031,331 | B2 * | 4/2006 | Schaub | 370/412 |
| 2002/0172195 | A1 * | 11/2002 | Pekkala et al. | 370/360 |
| 2003/0035372 | A1 * | 2/2003 | Schaub | 370/230 |

OTHER PUBLICATIONS

Brent N. Chun, Alan M. Mainwaring, David E. Culler, "Virtual Network Transport Protocols for Myrinet," Computer Science Division, University of California at Berkeley, Aug. 20, 1997, pp. 1-14.
W. J. Dally, "Virtual-Channel Flow Control," Artificial Intelligence Laboratory and Laboratory for Computer Science, Massachusetts Institute of Technology, 1990, pp. 60-68.
Hans Eberle, "Clint: A Cluster Interconnect with Independent Transmission Channels," HOT Interconnects 8, Aug. 16-18, 2000, pp. 1-9.
Hans Eberle, Nils Gura, "Separated High-bandwidth and Low-latency Communication in the Cluster Interconnect Clint," Sun Microsystems, Oct. 2002, pp. 1-20.
Mark J. Karol, Michael G. Hluchyj, Samuel P. Morgan, "Input Versus Output Queueing on a Space-Division Packet Switch," IEEE Transactions on C ommunications, Dec. 1987 (vol. COM-35, No. 12), pp. 1347-1356.

(Continued)

*Primary Examiner*—Wing Chan
*Assistant Examiner*—Gregory B. Sefcheck
(74) *Attorney, Agent, or Firm*—Osha•Liang LLP (57) ABSTRACT

A prefetching technique for a network interface is provided to give the network interface the opportunity to prefetch data out-of-order into send queues in the network interface, rather than prefetching data in the order produced and deposited into main memory. That allows, the state of the send queues to be taken into consideration when deciding an appropriate order to prefetch data.

25 Claims, 6 Drawing Sheets

OTHER PUBLICATIONS

U.S. Appl. No. 09/540,731, filed Mar. 31, 2000, entitled "Method and Apparatus for a Pipelined Network" by Hans Eberle and Neil C. Wilhelm.

U.S. Appl. No. 09/540,729, filed Mar. 31, 2000, entitled "Least Choice First Arbiter," by Nils Gura and Hans Eberle.

U.S. Appl. No. 09/540,779, filed Mar. 31, 2000, entitled "A Data Network with Independent Transmission Channels," by Hans Eberle, Neil C. Wilhelm, and Nils Gura.

U.S. Appl. No. 09/621,031, filed Jul. 21, 2000, entitled "Distributed Least Choice First Arbiter," by Nils Gura and Hans Eberle.

* cited by examiner

PREFETCHING TECHNIQUES FOR NETWORK INTERFACES

BACKGROUND

1. Field of the Invention

This application relates to network interfaces and more particularly to prefetching of data by network interfaces.

2. Description of the Related Art

In a typical networked computer system, the path of a data packet transmitted from a host to another host over the network includes several memories to temporarily hold the packet. Temporary storage is provided by the main memories of the hosts and memories located on the network interface cards (NICs). Unloading the main memories in strict First in First Out (FIFO) order can lead to a problem known as head-of-line blocking, which can result in reduced network throughput and increased forwarding time. Head-of-line blocking occurs when the next item to be unloaded (i.e. at the head of the line) cannot be unloaded because its destination is full. That blocks the other items behind the blocked item until the blocked item at the head of the line is finally unloaded.

It would be desirable to provide a network interface that avoids head-of-line blocking problems and more efficiently prepares data for transmission on a network with the goal to provide higher network throughput and lower network latency.

SUMMARY

An out-of-order prefetching technique for a network interface gives the network interface the opportunity to prefetch data packets in an order different than the order they were made available in memory. The prefetching technique allows the state of the send queues, which may reflect the state of the network, to be taken into consideration when deciding the appropriate order to prefetch packets. Thus, if one of the send queues is blocked due to network congestion, data for other send queues may be prefetched and made available to the network, which can result in higher network throughput and lower network latency.

In one embodiment, the invention provides a method that includes prefetching data to be transmitted over a network into send queues in the network interface from a data storage. Respective send queues are provided for respective destinations on the network. The prefetching is performed, at least some of the time, out of order with respect to the order in which the data in the data storage became available for prefetching. The method may further include receiving a hint in the network interface, prior to the prefetching, to help determine the order in which data should be prefetched into the send queues.

In another embodiment, a network interface is provided that includes a plurality of send queues, each send queue corresponding to a target on a network to which the network interface couples. A data entity descriptor storage stores a plurality of data entity descriptors. The network interface prefetches a data entity from data entity storage out of order with respect to the order in which the data entity was available for prefetching, according to a state of the send queues and according to the stored data entity descriptors. The network interface stores the prefetched data entity into one of the send queues prior to transmission on the network.

In another embodiment a method is provided for implementing out of order prefetching from a host by a sending network interface circuit. The method includes storing a plurality of data packets in a send buffer storage on the host, notifying the network interface circuit that a data packet is ready to be transferred from the send buffer storage into one of a plurality of send queues for respective destinations on a network, by writing a data packet descriptor to the network interface circuit, the data packet descriptor identifying one of the send queues. The network interface circuit transfers one of the data packets from the send buffer storage to one of the send queues, out of order with respect to an order in which the data packets became available for transfer out of the send buffer storage.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
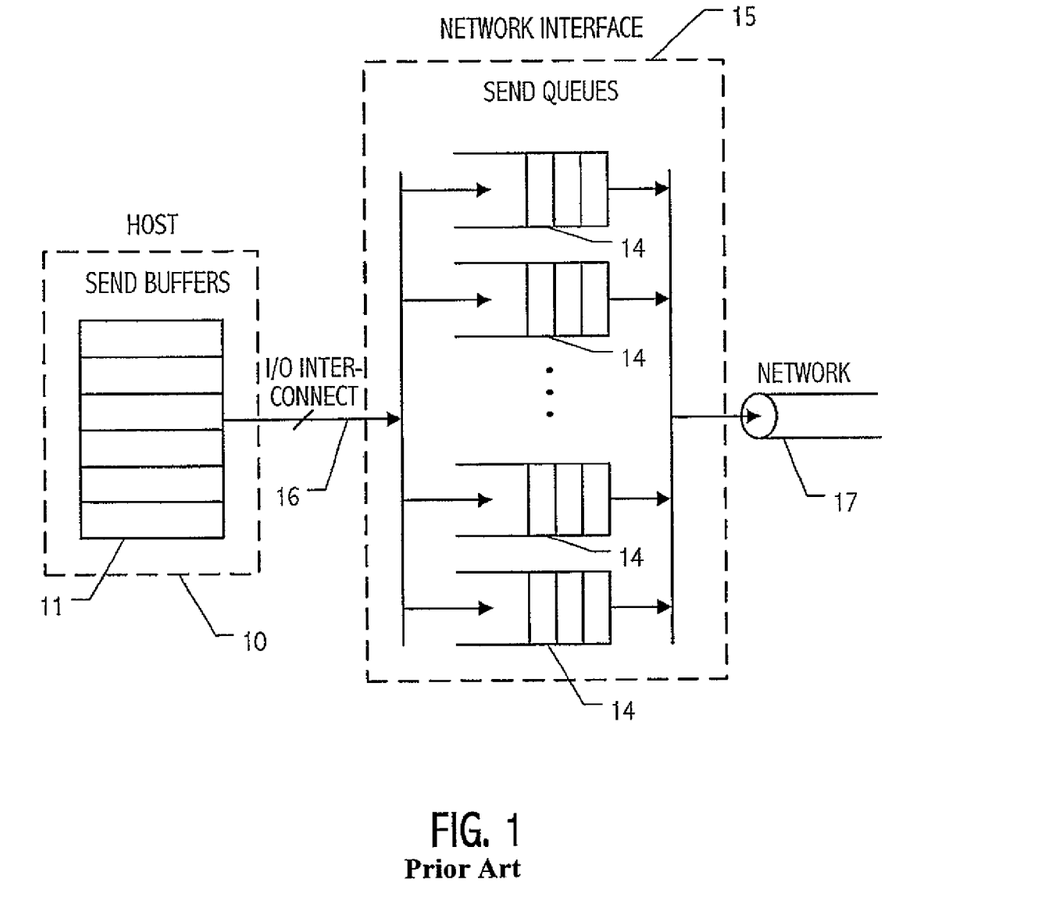
FIG. 1 shows a typical organization of a sending host in a networked environment.

FIG. 1 shows a typical organization of a sending host 10 in a networked environment. Data is generated, for example, by a user application, and deposited into send buffers 11 located in main memory in the host 10. Next, data is transferred from the send buffers 11 to send queues 14 located on the network interface card (NIC) 15 over the input/output (I/O) interconnect 16. In one embodiment, the I/O interconnect 16 is a PCI bus. Finally, data is transferred from the send queues 14 to the network 17. In one embodiment, respective send queues 14 are provided for respective destinations on the network. In another embodiment, respective send queues are provided for respective endpoints. If the send buffers 11 are filled and emptied in strict FIFO order, head-of-line blocking can result. FIFO order would imply that data is transferred from the send buffers 11 to the send queues 14, in the order the send buffers 11 were filled by the host or at least made available by the host. Using out of order unloading of the send buffers 11 to the send queues 14 avoids head-of-line blocking problems as described further herein.

Note that the term "destination" on the network as used herein refers to actual physical nodes on the network, or combinations of physical nodes, or to logical destinations such as endpoints, virtual networks, or collections of endpoints.

Figure 2:
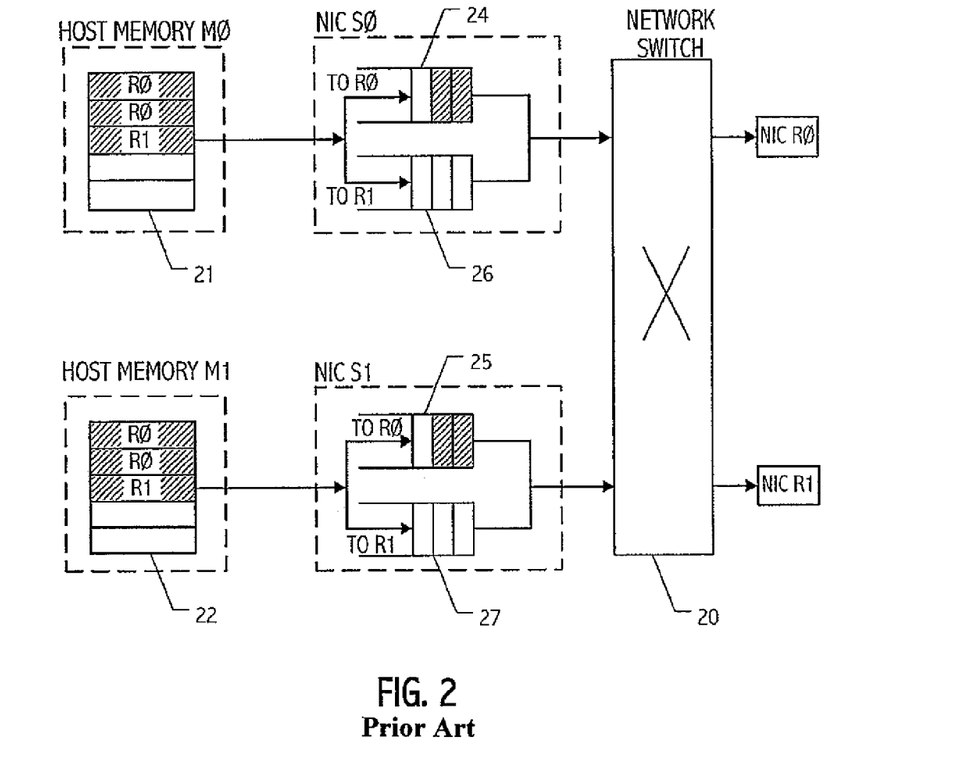
FIG. 2 shows an example of two sending NICs and two receiving NICs coupled by a network switch.

Referring to FIG. 2, an example is shown of a network switch 20 connecting two sending NICs S0 and S1 with two receiving NICs R0 and R1. The sending NICs contain separate send queues for each of the receiving NICs. In the example shown in FIG. 2, both S0 and S1 contain packets to be sent to R0. As a result, congestion arises and, eventually, packets back up in the send queues for R0.

FIG. 2 illustrates how prefetching in FIFO order leads to head-of-line blocking. Assume that the send queues 24-27 are individually flow-controlled and that, in each NIC S0 and S1, the send queues 24 and 25 for R0 each have two entries and are stopped. The send queues 24 and 25 were stopped because R0 was not able to keep up with the network. Assume also that the send queues 26 and 27 for R1, with no entries, are not stopped. Further assume that packets in both memories M0 and M1 are generated in the order R0, R0, R1. If packets are prefetched in FIFO order, packets destined for R0 are prefetched next. Once those packets are prefetched, the send queues 24 and 25 for R0 become full (assuming three packets can be stored in each send queue) and no further packets can be prefetched until these queues drain. This leads to a performance loss since the main memories contain packets destined for R1 that could be prefetched and sent.

Out-of-order prefetching avoids the head-of-line blocking problem. In one embodiment, the NICs S0 and S1 consider the fill level of the send queues in determining what packet to prefetch from the send buffers 21 and 22. In such an embodiment, and given the example shown in FIG. 2, preference is given to prefetching packets destined for R1 to increase the number of send queues available to choose from when allocating the network switch 20. Having more send queues available more likely results in higher network throughput and lower network latency. Since the send buffers 21 and 22 have been loaded with the packet destined for R1 last, prefetching packets for R1 requires prefetching from the send buffers into the send queues in a non-FIFO order. Note that criteria in addition to fill level, as described further herein, can be used to determine prefetch order.

Figure 3:
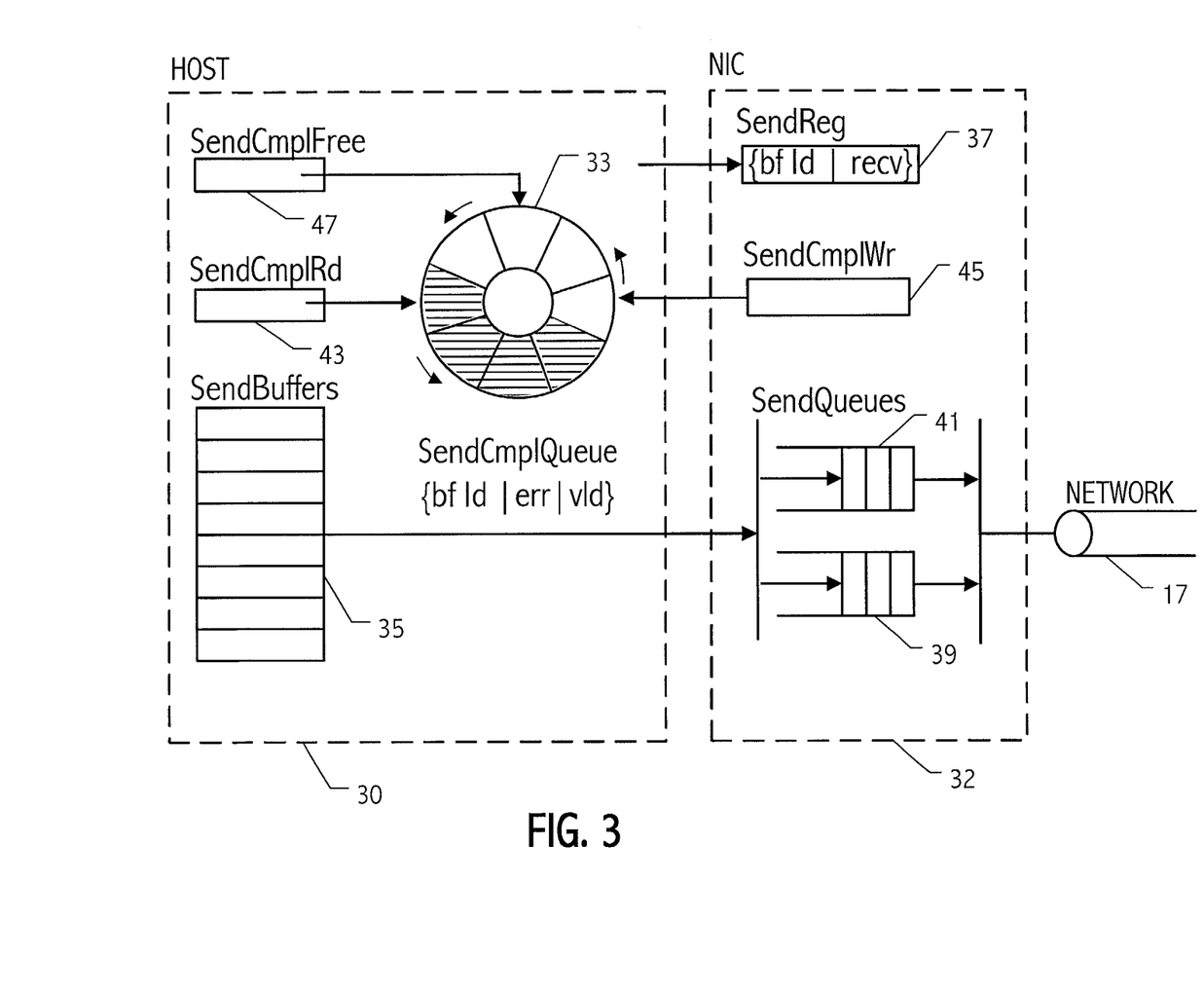
FIG. 3 shows an implementation of the handshaking protocol between the host memory and the NIC according to an embodiment of the invention.

FIG. 3 shows an implementation of a handshaking protocol between the host 30 and the NIC 32 that allows for out-of-order prefetching of packets by a sending NIC. Again, assume that the NIC holds a separate send queue for each receiving NIC. The steps for sending a packet are as follows. The host 30 dequeues a free buffer from the send complete queue (SendCmplQueue) 33. The host then writes the packet into the corresponding entry in the send buffers (SendBuffers) 35. The host notifies the NIC 32 that a packet is ready to be transmitted by writing a packet descriptor into the send register (SendReg) 37. The descriptor contains various information describing the data packet that is ready to be transmitted. For example, the descriptor may contain a buffer ID (bfid) field describing the location of the data packet in the send buffers 35. In addition the descriptor may contain the identifier (recv) of the receiving NIC. That identifier also identifies the send queue corresponding to the receiving NIC into which the packet associated with the descriptor will be transferred.

In another embodiment, the host notifies the NIC 32 that a packet is ready by supplying a location of the packet, e.g., the buffer ID. The NIC 32 then obtains the information that would have been sent in the packet descriptor, by e.g., reading the packet header out of the send buffers 35 that identifies such information as the packet destination.

The NIC 32 transfers the packet from the send buffers 35 to send queues 39 or 41 according to the identifier (recv) of the receiving NIC contained in the descriptor. Once the packet has been transmitted, the NIC 32 notifies the host 30 by enqueuing an entry into the send complete queue (SendCmplQueue) 33. That entry includes, in one embodiment, the location of the data packet in the send buffers 35 (the buffer ID (bfid)), a valid bit (vld) indicating whether the entry is a valid entry, and an error report bit (err) indicating whether the transfer was successful. In one embodiment, the NIC 32 may notify the host 30 once the send queue has been loaded with the data packet rather than after the transfer is completed across the network. Finally, the host dequeues the entry from the send complete queue (SendCmplQueue) 33.

In one embodiment, constant values are used for vld to indicate whether the entry is valid or invalid. For example, when an entry is enqueued, it is marked as valid by setting vld to 1, and when an entry is dequeued, it is marked as invalid by setting vld to 0.

In another embodiment, the polarity of vld alternates. That is, when the NIC 32 enqueues an entry, it marks it as valid by inverting the current value of vld. The value of vld remains unchanged when the host 30 dequeues an entry. The polarity changes after n entries have been enqueued or dequeued, respectively, where n is the number of queue entries. That is, the NIC changes polarity of the encoded vld bit after n entries are enqueued and the host assumes the polarity is changed after n entries are dequeued. Both the NIC 32 and the host 30 can use counters to track the polarity of vld.

The send complete queue (SendCmplQueue) 33 may be implemented as a ring buffer that contains as many entries as there are entries in send buffers 35. That way, send complete queue (SendCmplQueue) 33 cannot overflow. The read and write pointers for send complete queue (SendCmplQueue) 33 are send complete read (SendCmplRd) 43 and send complete write (SendCmplWr) 45. Send complete write (SendCmplWr) 45 is located on the NIC 32 and points to the next entry to be written. The read pointer SendCmplRd 43 is located in the host and points to the next entry to be read.

In one embodiment, send complete queue (SendCmplQueue) 33 is also used to maintain a list of free buffers. The pointer SendCmplFree 47 points to the next free buffer. Free buffers can be dequeued as long as SendCmplFree does not reach the entry pointed to by SendCmplRd. Of course, the send complete queue 33 is exemplary and there are other ways to implement send complete queue 33 in addition to the implementation shown here. For example, the free buffers may be maintained in a separate queue.

The NIC 32 is expected to consume entries written into send register 37 faster than they are written by the host. That is, temporary storage is needed to store the packet descriptors written into send register 37 until they are processed. Temporary storage stores the packet descriptors of packets to be prefeteched as well as packets that have not yet been transmitted. Separate queues may be used to maintain data descriptors for separate destinations. In addition, separate queues may be maintained for data that has been prefetched and not yet transmitted and for data that has not yet been prefetched. The queues may be managed using one or more state machines in the NIC that determine when an entry has been prefetched or transmitted and that updates the queue or queues appropriately.

The identification of the receiving NIC contained in the data descriptor can be used to determine the order in which packets are prefetched from main memory. In particular, by obtaining this "hint", the NIC does not have to access and examine the actual packet to determine the receiving NIC.

Note that in the described embodiment, the packet descriptors are written into send register 37 in the order the corresponding packets are made available. That may be the order the corresponding packets are written into the send buffers 35. The NIC can track the order the packets are made available so that packets destined for the same receiving NIC are delivered in order. However, packets destined for different receiving NICs may be delivered in any order relative to each other. In other embodiments, more complicated data dependencies may exist. For example, even within the same send queue only certain data packets may be required to be sent in order.

To check for a completed packet descriptor, the host can poll the send complete queue (SendCmplQueue) 33 until the valid bit (vld) of the entry pointed to by SendCmplRd becomes true. Since the send complete queue (SendCmplQueue) 33 is typically located in cached memory, repeated access to check the valid bit will not tie up main memory. Alternatively, the NIC 32 can generate an interrupt when an entry was enqueued into SendCmplQueue 33.

Figure 4:
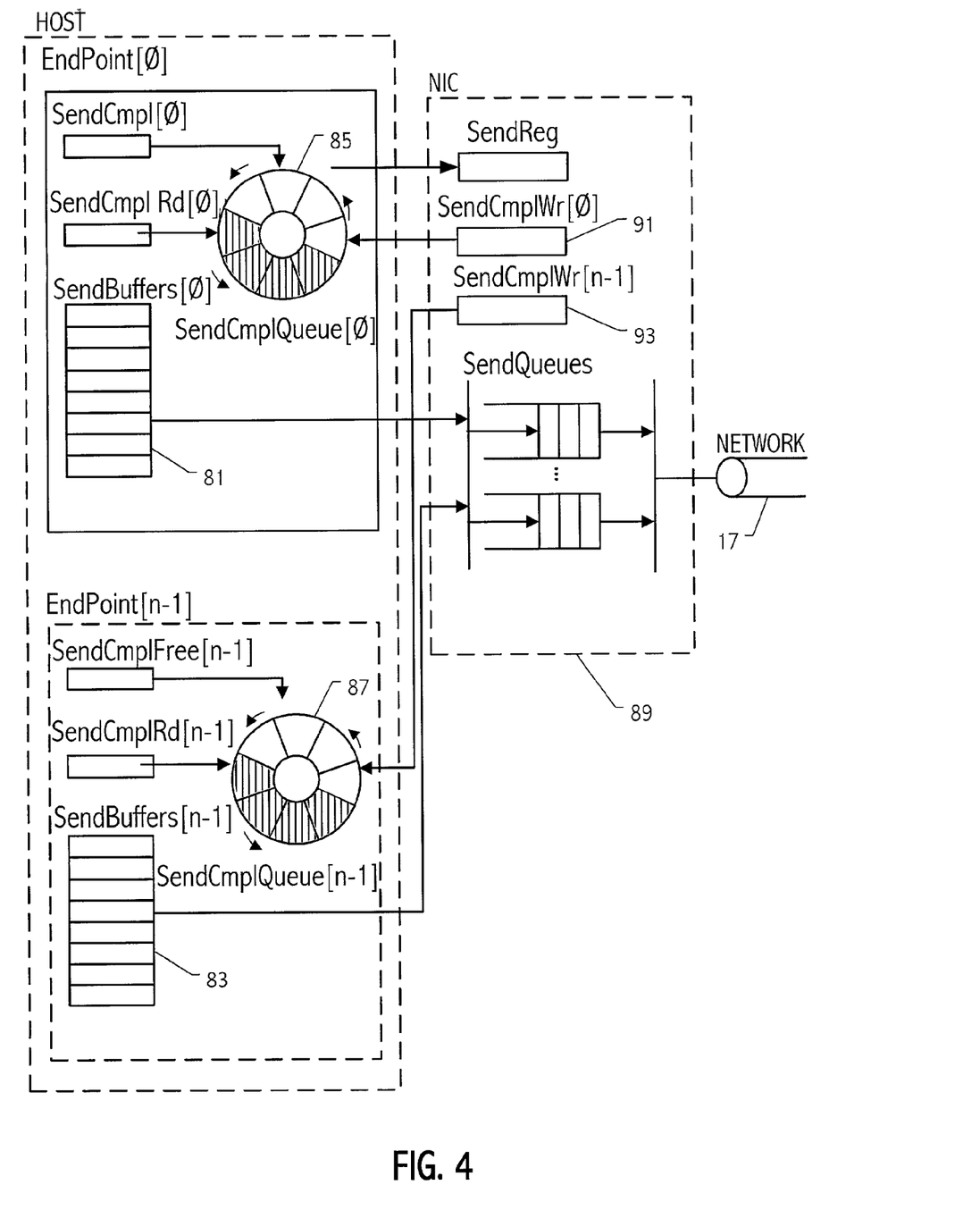
FIG. 4 shows another embodiment of an implementation of the handshaking protocol between the host memory and the NIC in which endpoints are used.

FIG. 3 assumed a common buffer pool in main memory. Typically, this buffer pool is located in kernel space and, if user applications want to send packets, the packets have to be first copied from user space to kernel space. FIG. 4 shows a variation of the organization that provides access points called endpoints with an endpoint being associated with an application or process running in user or kernel space. In that embodiment separate send buffers 81 and 83 are provided for each endpoint. In addition, each endpoint has its own send complete queue 85 and 87, respectively. The NIC 89 supports the endpoint specific send complete queues with separate send complete write pointers 91 and 93.

Note that the send queues on the NIC are typically implemented with a single memory device. Thus, it need not be the case that each send queue is allocated a fixed number of entries. Rather, a common pool of packet buffers can be provided that is managed by queues holding the addresses of the buffers. To prevent one queue from consuming all buffers, the length of the queues may be limited. Referring to FIG. 2, for example, the NIC S0 might contain a total of four buffers in the common pool of packet buffers (not shown) and the lengths of each of the send queues 24 and 26 might be limited to three entries so that none of the queues can consume all buffers.

Different strategies can be applied to choosing the order in which packets are prefetched and transferred to the send queues. One strategy is for the NIC to try and keep the send queues leveled, that is, to try to fill the queues such that they all contain the same number of packets. In one approach to implementing that strategy, the average number of packets contained in all the queues is determined. The send queues are visited in round-robin order; and if the number of packets in a particular send queue is smaller than the average number of packets contained in all the queues and a packet descriptor identifying the particular send queue (i.e., a packet for the receiving NIC corresponding to the particular send queue) is available, that packet is prefetched.

Another strategy is to prefetch a data packet for the send queue with the least number of packets. That is, the NIC tracks the send queue with the fewest packets and prioritizes prefetching a data packet for that queue. When a data packet descriptor indicates that a data packet for the send queue with the least number of packets is available, that send queue is filled. If a data packet for the send queue with the fewest packets is not available, the NIC may prefetch a data packet for the send queue with the next fewest number of data packets.

Still another strategy is to prioritize prefetching a data packet for the send queue that has been least frequently visited. If a data packet for the send queue that has been least frequently visited is not available, the NIC may prefetch a data packet for the send queue with the next fewest number of visits. Another strategy is to prefetch the packet corresponding to the send queue that has not been served for the longest period of time. Another criterion may be to prefetch the packet corresponding to the packet descriptor whose destination identification (recv field) refers to the send queue with the highest priority. The priority may be assigned by the host. Alternatively, the priority may be packet based rather than send queue based with the priority being provided as a hint in the packet descriptor field. The prefetch based on priority may be combined with any one or more of the strategies or criteria described above. In addition, even without utilizing priority as a basis for prefetching into the send queues, the various strategies and criteria for prefetching may be combined.

The prefetching technique works well with the network architecture described in patent application Ser. No. 09/540,732, filed Mar. 31, 2000, entitled "System and Method for a Non-Blocking Buffer-Less Network", naming Hans Eberle et al. as inventors; application Ser. No. 09/540,779, filed Mar. 31, 2000, entitled "A Data Network with Independent Transmission Channels", naming Hans Eberle et al. as inventors; application Ser. No. 09/540,732, filed Mar. 31, 2000, entitled "Method and Apparatus for a Pipelined Network", naming Hans Eberle et al. as inventors; application Ser. No. 09/540,729, filed Mar. 31, 2000; entitled "Least Choice First Arbiter", naming Nils Gura et al. as inventors; and application Ser. No. 09/621,031, filed Jul. 21, 2000, entitled "Distributed Least Choice First Arbiter", naming Nils Gura et al. as inventors, which are incorporated by reference herein. Using the architecture described therein, the scheduler of the network switch is able to better optimize switch throughput by considering all non-empty send queues. Note that the prefetching technique described herein also applies to network architectures that do not offer tight coupling between switches and NICs.

Figure 5:
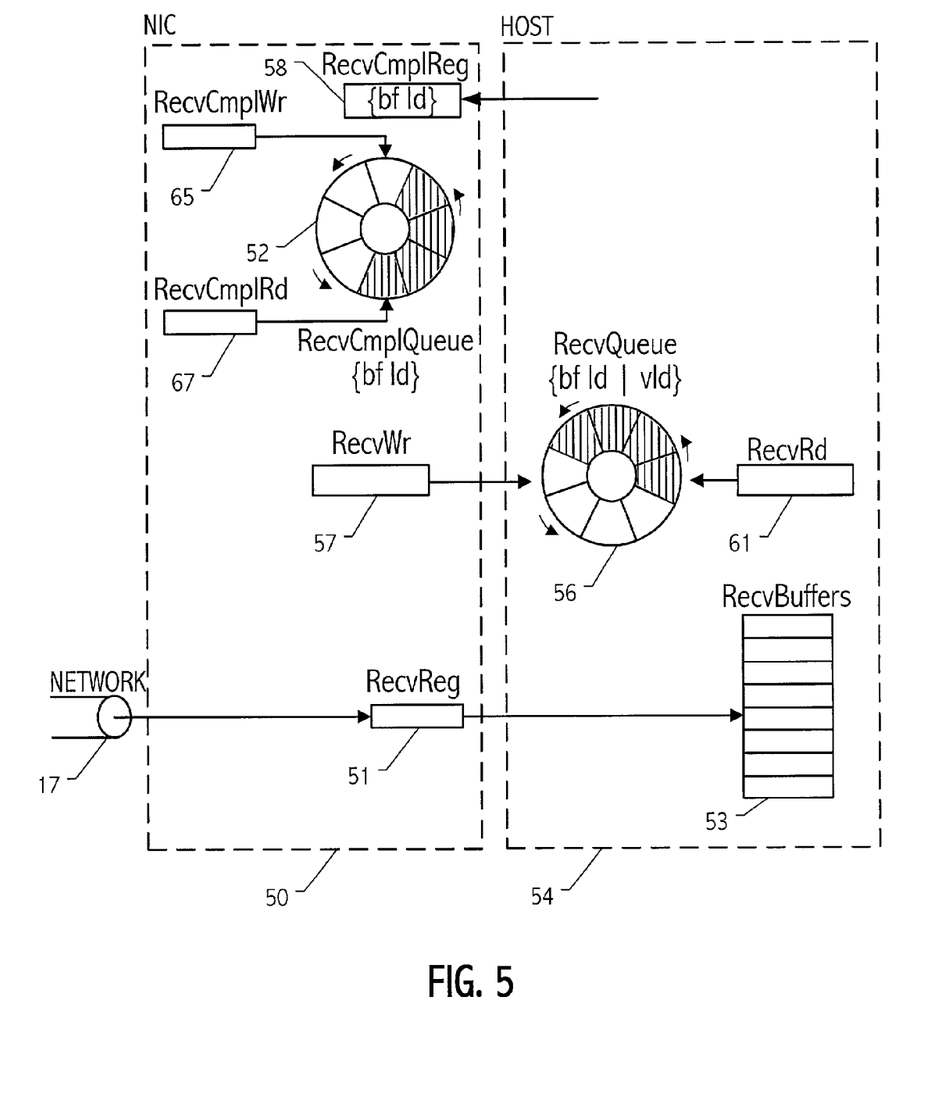
FIG. 5 shows a receive side of a NIC.

Referring to FIG. 5, the organization of an exemplary receiving NIC 50 is shown. The NIC performs the following actions to receive a data packet. When a packet is received from the network 17, the NIC 50 writes the received packet into the receive register (RecvReg) 51. RecvReg 51 can be organized as a FIFO that holds several packets to decouple reception from the network and delivery to main memory. On receipt of a data packet into RecvReg 51, the NIC gets a free buffer from the receive complete queue (RecvCmplQueue) 52. The NIC 50 transfers the received packet from RecvReg 51 into the entry in receive buffers (RecvBuffers) 53 that corresponds to the free buffer obtained from the receive complete queue (RecvCmplQueue) 52. The NIC 50 then notifies the host 54 that a packet was added to receive buffers (RecvBuffers) 53 by enqueuing a packet descriptor into the receive queue (RecvQueue) 56 at a location in the receive queue pointed to by the write pointer RecvWr 57. The NIC may, in addition, generate an interrupt to notify the host. The descriptor contains the index buffer ID (bfId) of the corresponding entry in receive buffers (RecvBuffers) 53 along with a valid bit (vld). The host 54 dequeues the packet descriptor and reads the corresponding entry in receive buffers (RecvBuffers) 53. The host 54 notifies the NIC 50 that the packet was read by writing bfId into the receive complete register (RecvCmplReg) 58. The NIC enqueues the freed buffer into the receive complete queue (RecvCmplQueue) 52.

The receive queue (RecvQueue) 56 may be in the form of a ring buffer that contains as many entries as there are entries in receive buffers (RecvBuffers) 53. That way, the receive queue (RecvQueue) 56 cannot overflow. The read and write pointers for RecvQueue 56 are receive write (RecvWr) 57 and receive read (RecvRd) 61. RecvWr 57 is located on the NIC and points to the next entry to be enqueued. RecvRd 61 is located in main memory and points to the next entry to be dequeued.

RecvCmplQueue 52 implements a free list on the NIC. It contains as many entries as there are entries in RecvBuffers 53 to prevent overflow. Receive complete write (RecvCmplWr) 65 points to the next entry to be enqueued and receive complete read (RecvCmplRd) 67 points to the next entry to be dequeued. While a free list could be implemented in a manner similar to the sending side, a separate free list is preferred in certain embodiments to avoid costly memory accesses by the NIC. The NIC is expected to consume entries written into RecvCmplReg 58 faster then they are written by the host.

Figure 6:
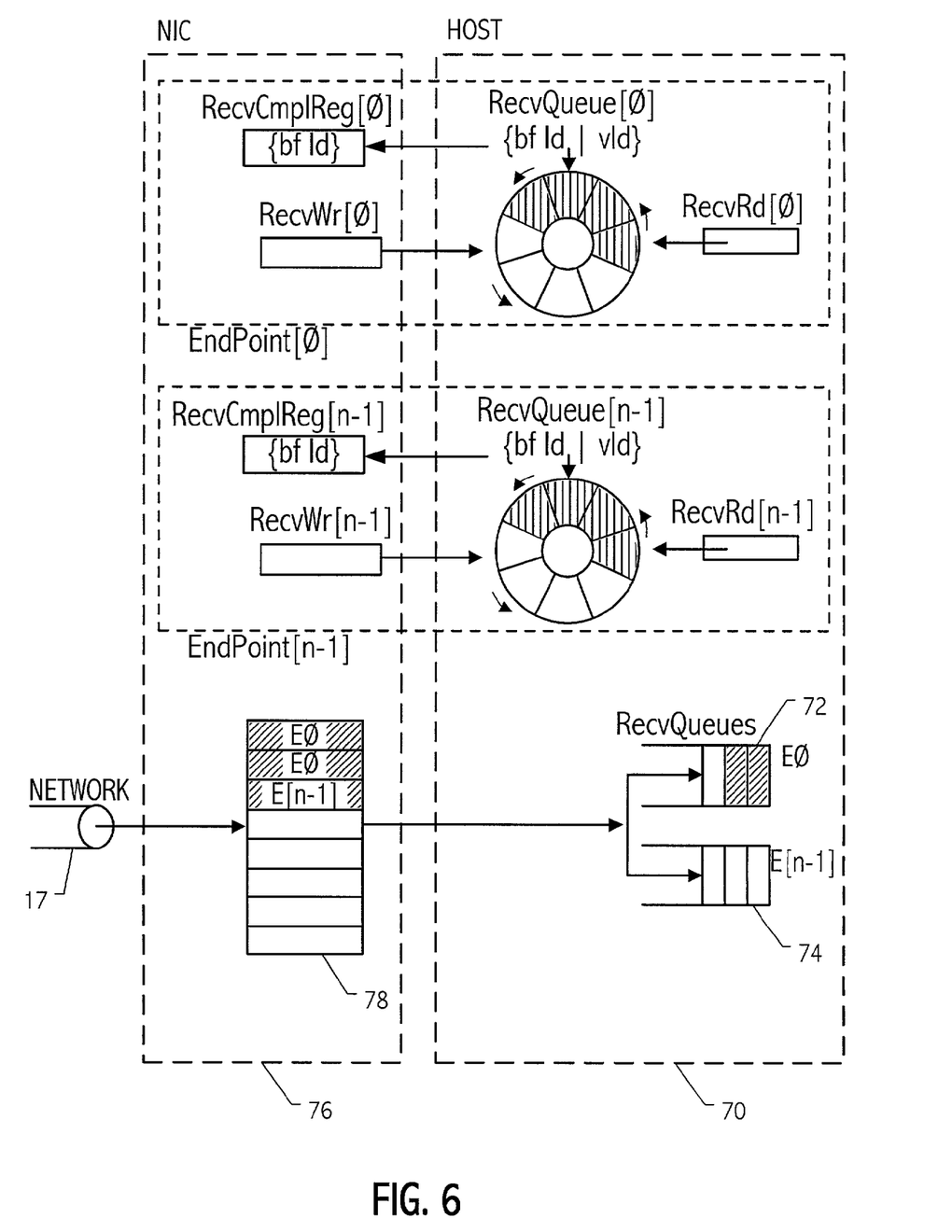
FIG. 6 shows an embodiment of a receive side of a NIC that addresses potential blockages on the receive side.

Typically, packets are delivered by the receiving NIC 76 to host memory in the order they are received from the network. Blockages similar to the ones observed on the sending side occur only rarely if the receive buffers in main memory are plentiful and the host consumes the buffers at a rate that avoids buffer overflow. However, if this cannot be guaranteed, out-of-order delivery might also be a suitable technique to speed up packet reception. An exemplary organization of such an out of order delivery structure is shown in FIG. 6. Here, the host 70 contains several receive queues (RecvQueues) 72 and 74. There is a separate receive queue for each endpoint, E0 and E[n−1]. A receive buffer 78 receives data packets from the network 17. By delivering packets out-of-order from receive buffer 78 applying one or more of the strategies outlined for the sending side, blockages can be avoided and the receive queues can be leveled, lessening the likelihood of blockages. Of course other methods may be used to demultiplex packet flows, e.g., using so-called virtual channels.

In one embodiment, the packet size of a transferred packet is 2K bytes. While the packet size may of course vary, data may also be exchanged between the NIC and the host in entities other than packets. Examples of other data entities include messages, files, streams, and virtual circuits. In these examples, a higher-level abstraction may represent a possibly large number of packets. Referring to FIG. 3, FIG. 4, FIG. 5, and FIG. 6, the handshaking protocol would operate on the higher-level abstraction, while the actual data transfers could still be split into smaller entities such as packets.

The description of the invention set forth herein is illustrative, and is not intended to limit the scope of the invention as set forth in the following claims. For example, the data storage may be storage other than main memory. Note also that while the term NIC has been used herein for convenience, the invention is generally applicable to any network interface circuit regardless of whether that circuit is disposed on a separate card or on the same card or module as the host. While specific examples of network interface circuits and hosts have been shown, variations and modifications of the embodiments disclosed herein, may be made based on the description set forth herein, without departing from the scope of the invention as set forth in the following claims.

What is claimed is:

1. A method comprising:

receiving a plurality of data descriptors at a network interface, wherein each of the plurality of data descriptors notifies the network interface that data is available in a data storage, and wherein each of the plurality of data descriptors supplies a location of data in the data storage;

selecting a send queue from a plurality of send queues in the network interface based on a fill of the send queue, wherein the send queue is associated with at least one destination on a network;

searching the plurality of data descriptors in the network interface for a data descriptor identifying the send queue after selecting the send queue; and prefetching data into the send queue from the data storage based on the data descriptor, the prefetching being performed, at least some of the time, out of order from an order in which the data in the data storage became available for prefetching.

2. The method of claim 1, wherein the send queue has been least frequently filled.

3. The method of claim 1, wherein the send queue has had data prefetched for it least recently.

4. The method of claim 1, wherein the fill of the send queue is below an average fill of the plurality of send queues.

5. The method of claims 1, wherein the send queue is further selected using a round robin process.

6. The method of claim 1, wherein the send queue is further selected based on a priority of the send queue.

7. A method for implementing out of order prefetching from a host by a sending network interface circuit, the method comprising:

storing a plurality of packets in a send buffer storage on the host;

writing a plurality of packet descriptors to the network interface circuit, wherein each of the plurality of packet descriptors is associated with one packet of the plurality of packets in the send buffer storage;

selecting a send queue from a plurality of send queues in the network interface based on a fill of the send queue;

searching the plurality of packet descriptors on the network interface circuit for a packet descriptor identifying the send queue after selecting the send queue; and the network interface circuit transferring a packet associated with the packet descriptor from a location in the send buffer storage supplied by the packet descriptor to the send queue, out of order with respect to an order in which the packet became available for transfer out of the send buffer storage.

8. The method of claim 7, wherein the send queue is selected based on a priority of the send queue.

9. The method claim 7 further comprising enqueuing a data entity descriptor in a send complete queue on the host after the packet is transferred to at least one selected from a group consisting of the send queue and a destination associated with the send queue.

10. The method of claim 9, wherein the data entry descriptor includes an identification of the packet a valid bit indicating whether the entry descriptor is valid, and an error bit indicating whether the transfer occurred without error.

11. The method of claim 10, wherein the polarity used to indicate validity by the valid bit changes after a predetermined number of data entry descriptors have been enqueued.

12. The method as recited in claim 7 wherein the host is coupled to the network interface circuit via an interconnect.

13. The method of claim 7, wherein the fill of the send queue is below an average fill of the plurality of send queues.

14. The method of claim 7, wherein the send queue has been least frequently filled.

15. The method of claim 7, wherein the send queue has had data preferteched for it least recently.

16. A computer system comprising:
a network interface including a plurality of send queues, each of the send queues corresponding to a target on a network to which the network interface couples;
data entity descriptor storage coupled to store a plurality of data entity descriptors;
a host coupled to the network interface including a data storage; and
a queue maintaining a list of completed data entity descriptors, a data entity descriptor being completed when an associated data entity is transferred to the network interface or transferred to its destination, the queue configured to be written by the network interface to enqueue a completed data entity descriptor and read by the host to dequeue a completed data entity descriptor;
wherein the network interface is responsive to prefetch a data entity from the data storage in the host out of order from an order in which the data entity was available for prefetching, according to a state of the send queues and according to the stored data entity descriptors in the data entity descriptor storage,
wherein a completed data entity descriptor in the queue includes a valid bit indicating whether an entry in the queue is a valid entry, thereby indicating that the associated data entity is completed, and
wherein the polarity used to indicate validity by the bit changes after a predetermined number of entries have been enqueued.

17. A computer system comprising:
a network interface including a plurality of send queues, each of the send queues corresponding to a target on a network to which the network interface couples;
data entity descriptor storage coupled to store a plurality of data entity descriptors;
a host coupled to the network interface including a data storage; and
a queue maintaining a list of completed data entity descriptors, a data entity descriptor being completed when an associated data entity is transferred to the network interface or transferred to its destination, the queue configured to be written by the network interface to enqueue a completed data entity descriptor and read by the host to dequeue a completed data entity descriptor;
wherein the network interface is responsive to prefetch a data entity from the data storage in the host out of order from an order in which the data entity was available for prefetching, according to a state of the send queues and according to the stored data entity descriptors in the data entity descriptor storage,
wherein a completed data entity descriptor in the queue includes a valid bit indicating whether an entry in the queue is a valid entry, thereby indicating that the associated data entity is completed, and
wherein the host assumes that the polarity used to indicate validity by the valid bit changes when a predetermined number of entries have been dequeued by the host.

18. An method comprising:
receiving a plurality of packet descriptors, wherein each of the plurality of packet descriptors is associated with at least one packet stored in a send buffer;
selecting a send queue of a plurality of send queues based on a fill of the send queue, wherein the send queue is associated with a network destination;
searching the plurality of packet descriptors for a packet descriptor associated with the send queue after selecting the send queue; and
prefetching a packet associated with the packet descriptor from the send buffer into the send queue, wherein the packet descriptor supplies a location of the packet in the send buffer.

19. The method of claim 18, wherein the fill of the send queue is below an average fill of the plurality of send queues.

20. The method of claims 18, wherein the send queue is further selected using a round robin process.

21. The method of claim 18, wherein the send queue is further selected based on a priority of the send queue.

22. The method of claim 18, further comprising:
enqueuing an entry representing the packet into a send complete queue after prefetching the packet, wherein the entry comprises a valid bit indicating whether the entry in the queue is a valid entry.

23. The method of claim 22, wherein the polarity used to indicate validity by the valid bit changes after a predetermined number of entries have been enqueued.

24. The method of claim 22, wherein the entry further comprises the location of the packet in the send buffer.

25. The method of claim 22, wherein the send complete queue and the send buffer are located on a host, and wherein the plurality of send queues are located on a network interface card.

* * * * *

UNITED STATES PATENT AND TRADEMARK OFFICE
CERTIFICATE OF CORRECTION

PATENT NO.        : 7,327,674 B2  
APPLICATION NO.   : 10/166874  
DATED             : February 5, 2008  
INVENTOR(S)       : Hans Eberle et al.

It is certified that error appears in the above-identified patent and that said Letters Patent is hereby corrected as shown below:

In Claim 16, column 9 (line 26), delete "entry" and replace with --entity--;

In Claim 16, column 9 (line 27), insert --valid-- before "bit".

Signed and Sealed this

Thirteenth Day of May, 2008

JON W. DUDAS  
*Director of the United States Patent and Trademark Office*